(12) United States Patent
Stierle et al.

(10) Patent No.: US 7,564,537 B2
(45) Date of Patent: Jul. 21, 2009

(54) MOBILE MEASURING SYSTEM, AND AN OPERATING METHOD FOR SUCH A MOBILE MEASURING SYSTEM

(75) Inventors: Joerg Stierle, Waldenbuch (DE); Peter Wolf, Leinfelden-Echterdingen (DE); Kai Renz, Leinfelden-Echterdigen (DE); Clemens Schulte, Stuttgart (DE); Jan Brietenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 10/903,458

(22) Filed: Jul. 30, 2004

(65) Prior Publication Data
US 2006/0023199 A1 Feb. 2, 2006

(51) Int. Cl.
*G01C 3/08* (2006.01)

(52) U.S. Cl. ............... 356/4.01; 356/4.1; 356/5.01; 356/5.1

(58) Field of Classification Search ........ 356/3.01–28.5
See application file for complete search history.

(56) References Cited

U.S. PATENT DOCUMENTS 4,321,683 A * 3/1982 Goring et al. ............... 702/152
7,030,969 B2 * 4/2006 Giger ......................... 356/5.02
2001/0038037 A1 * 11/2001 Bridgelall et al. ...... 235/462.14
2002/0196422 A1 * 12/2002 Tanabata et al. ........... 356/3.13
2003/0193657 A1 * 10/2003 Uomori et al. ............. 356/3.1

FOREIGN PATENT DOCUMENTS

| CH | 1315/01 | * | 7/2001 |
| DE | 0828165 | * | 11/1998 |
| DE | 100 63 483 | | 7/2001 |

* cited by examiner

*Primary Examiner*—Thomas H Tarcza
*Assistant Examiner*—Luke D Ratcliffe
(74) *Attorney, Agent, or Firm*—Michael Best & Friedrich LLP

(57) ABSTRACT

The invention relates to a mobile measurement system, comprising at least one apparatus (16) for optical distance measurement having at least one transmission unit having a light source for emitting modulated, optical radiation (24) in the direction of a target object (26), and having a reception unit for receiving the optical measurement radiation (28) returning from the target object (26), and having an actuation appliance (18, 20, 60) having at least one memory element (42) for holding data, the apparatus (16) for optical distance measurement being connected to the actuation appliance (18) via an interface (31) for the purpose of data transmission. The invention proposes that the interface (31) be a radio interface. The invention also relates to a method of operation for such a mobile measurement system in which the connection setup between the appliances takes place automatically.

20 Claims, 3 Drawing Sheets

MOBILE MEASURING SYSTEM, AND AN OPERATING METHOD FOR SUCH A MOBILE MEASURING SYSTEM

BACKGROUND OF THE INVENTION

The invention relates to a mobile measurement system and to a method of operation for such a measurement system. The invention also relates to a computer program product for controlling the method of operation.

Laser rangefinders are used extensively today by craftsmen, architects and engineers for recording measurements. In this case, the measurements are taken in situ, i.e. on the respective building site, and are usually noted in handwriting. These notes are then input manually into a piece of office software, for example in order to produce calculations, construction drawings or tenders.

For a few years, laser rangefinders having a relatively large memory and extended processor power are available in which it is possible to store the data in situ, without handwritten notes, in the appliance itself. A significant drawback of such appliances is the fact that the recorded measured values need to be allocated using very complicated text input, and the stored volumes of data are not very clear on the available displays on the laser rangefinder.

Equally, laser rangefinders are known which have a cable interface allowing the values stored in the measuring appliance to be read out directly in situ or subsequently, for example in the office using a PC.

In this context, it has since also become possible, by way of example, to use a mobile PC connected to the laser rangefinder by means of a cable to transfer the measured values to a file on the PC actually in situ.

A drawback of such appliances from the prior art besides the use of cables for data transmission, which entails a risk of loss or—particularly in the building site environment—the risk of cable breakage, is the fact that firstly very expensive laser rangefinders and secondly correspondingly expensive, portable PCs are needed which are in turn used only as a storage medium.

DE 100 63 483 A1 discloses a laser rangefinder having a laser measurement unit and a memory element for storing the measured data which has one or more interfaces for transmitting data from a computer and/or for transmitting the ascertained data to a computer. In particular, the interface for the laser rangefinder from DE 100 63 483 A1 is in the form of an infrared interface or, in an alternative embodiment, in the form of an RS interface.

It is an object of the invention to provide an inexpensive and mobile measurement system which additionally assures ease of use for the user.

SUMMARY OF THE INVENTION

The content of the present invention is an inexpensive, mobile measurement system comprising a laser rangefinder and an external actuation appliance, which is separate from the laser rangefinder, for use in situ.

The inventive, mobile measurement system, comprising an apparatus for optical distance measurement, for example a laser rangefinder, having at least one transmission unit and a light source, for example a semiconductor laser for emitting modulated, optical measurement radiation, and a reception unit for receiving the optical measurement radiation returning from a target object also has an actuation appliance having at least one memory element for holding data, particularly measured data. In this case, the inventive apparatus for optical distance measurement is connected to the actuation appliance via a radio interface for the purpose of data transmission. The connection of two separate appliances, the laser rangefinder and the PC, via a universal radio interface generates an inexpensive mobile measurement system.

The universal radio interface ensures user-friendly handling and compatibility with a multiplicity of computers, particularly including mobile PCs. In this case, the laser rangefinder advantageously does not require any cable connection and can thus be better protected against soiling and moisture. A PC, particularly a mobile PC, which is already used for other applications by a potential user of the inventive measurement system, can also advantageously be used efficiently by the invention for mobile measurement recording.

In the invention's underlying method of operation for a mobile measurement system, comprising an apparatus for optical distance measurement and an actuation appliance which are able to be connected electronically via a radio interface for the purpose of data transmission, the connection setup between the appliances takes place automatically. A user therefore does not need to concern himself at all with the necessary configuration of the interface. By way of example, no COM port, no baud rate and no transition formats or the like need to be selected for the inventive apparatus or for the inventive method of operation for this apparatus. A user also does not have to call up a further connection tool in order to set up a connection. This is all done via the integrated system control using appropriate software control.

Advantageous developments of the inventive mobile measurement system and of the inventive method of operation for such a mobile measurement system can be found in the features listed with the subclaims.

Advantageously, the interface used is a radio interface based on the Bluetooth standard. This allows reliable transmission of data over a range of approximately 10 m by radio and compatibility with a multiplicity of computers, particularly standard computers.

The actuation appliance is advantageously provided by a computer, particularly by a standard PC. In a particularly advantageous fashion, the actuation appliance can be provided by a mobile standard PC, such as a laptop or else, in other embodiments, by a PDA (Personal Digital Assistant). A computer program product is loaded onto this computer and allows this computer to be used as an actuation appliance for a correspondingly equipped laser rangefinder. The universal radio interface, particularly based on the Bluetooth standard, thus allows an inexpensive laser rangefinder to be connected to a commercially available personal computer (PC), particularly a mobile standard PC. Advantageously, the connection setup between the actuation appliance and the apparatus for optical distance measurement (laser rangefinder) via the radio interface is effected automatically in this case as soon as the computer program product is started on the computer.

Advantageously, the actuation appliance has control and/or indicator elements which allow the actuation appliance to be used as remote control for the apparatus for optical distance measurement. All functions going beyond the actual measurement method, such as calculations, storage and display of measured data and also operation of the rangefinder, can be eliminated from the laser rangefinder and shown on an inexpensive, mobile standard PC, for example in the form of softkeys. Since the actuation appliance in the form of a mobile PC or PDA is connected to the laser rangefinder by radio over a relatively long range in the order of magnitude of 10 m, the invention thus provides for the actuation appliance to be a remote control for the laser rangefinder. This advantageously results in the laser rangefinder being able to be produced less expensively, smaller and more easily, since components which are expensive in terms of price and physical space, such as display, memory, processor or keyboard, can be dispensed with completely or in part.

The connection of two separate appliances, the laser rangefinder and the PC, via a universal interface thus generates an inexpensive mobile measurement system, especially since the user can also use the computer used as an actuation appliance for other applications, or a computer already provided as standard can also be used for use in a mobile measurement system. The universal radio interface ensures user-friendly handling and compatibility with a multiplicity of mobile PCs. In this case, the laser rangefinder does not require a cable connection, in particular, and can thus be better protected against soiling and moisture.

The reduction of the functions of the actual laser rangefinder significantly reduces the power consumption of the laser rangefinder, which achieves longer battery service lives. In addition, it is possible, for example through software-controlled power management, to transfer the radio link between the laser rangefinder and the associated actuation appliance to a sleep mode after a few seconds if no data transmission has taken place. Such a refinement allows the battery life to be increased significantly again.

A neutral-language symbol-based formula assistant integrated in the actuation appliance additionally allows simple operation of the actuation appliance and hence of the overall mobile measurement system.

In one advantageous embodiment of the inventive mobile measurement system, mechanical connection means are provided on the laser rangefinder and/or on the actuation appliance, which allow the two appliances to be fastened to one another. The effect achieved by this is that input into the actuation appliance, which in mobile PCs is usually done by stylus, becomes user friendly, since a user only needs to hold one appliance unit.

In the inventive method of operation for a mobile measurement system which comprises an apparatus for optical distance measurement and an actuation appliance having at least one memory element for holding data, the connection setup between the appliances takes place automatically. A control program which can be integrated in the mobile measurement system, for example in the form of a loadable piece of driver software, can be used for automatically controlling the connection setup, particularly the setup of a radio link based on the Bluetooth standard.

Advantageously, this automatic connection setup involves all apparatuses for optical distance measurement which can be reached and are available via the interface being addressed. A selection window on the actuation appliance in a mobile measurement system is used to indicate all positively addressed apparatuses for optical distance measurement, particularly to indicate them with their serial number, so that a user can subsequently select the apparatus for optical distance measurement which he requires. This selection by the user can be followed by the use of direct communication, particularly serial communication, with the desired apparatus for optical distance measurement.

In this case, this radio link's readiness for use can be announced by an indicator in a display on the actuation unit, for example. Other appliances are now no longer able to disrupt the operation and particularly the data transmission between the actuation appliance and the selected laser rangefinder. If the laser rangefinder is turned off, the PC automatically attempts to restore the connection to this appliance. It is also conceivable for the PC to take into account other appliances in the surrounding area following an unsuccessful search for the last appliance connected. Only if the connection between the actuation appliance and the selected apparatus for optical distance measurement is interrupted, for example because an appliance is turned off or because the radio interface's range has been exceeded, is it thus possible for other apparatuses for optical distance measurement which can be reached via the interface in the surrounding area of the system to be taken into account again, these then being shown again in an appropriate manner on the actuation appliance's display.

Once the connection between the apparatus for optical distance measurement and the actuation appliance, for example a standard PC or PDA, has been set up, measured data are automatically transmitted for each measurement by the apparatus for optical distance measurement. It is thus advantageously not necessary for measured-value transmission to be initiated separately first, but rather it is likewise performed automatically by the computer program product which controls the inventive method of operation and is used as driver software. If the interface connection is interrupted, for example as a result of an appliance being turned off, then attempts are likewise made—automatically—to restore the connection.

The measured-data transmission is advantageously in a form such that the measured data are always written to the current position of a cursor in a software product implemented in the actuation appliance. This advantageously allows universal use of any software products by virtue of the measured-data transmission always being written to the current cursor position. Any software which also allows keyboard input can thus be used for displaying or further processing the measured data from the apparatus for optical distance measurement. When a measurement has been initiated, for example using a mobile PC, the measured value recorded is automatically transmitted via the radio interface and is indicated at the current cursor position on the display provided on the PC used as the actuation appliance. In this case, an audio output integrated in the actuation appliance is advantageously used to signal the successful conclusion of a measurement.

Thus, by way of example, a piece of measurement software known as standard may advantageously be used by the user directly in order to allocate the measured values directly and clearly to corresponding positions, yields or objects, or else to calculate or store results. In addition, there is the greatest degree of flexibility, since the interface permits direct linkage to various measurement software independently of application. A full tender can thus also be produced directly, for example, in situ. Should the user or operator have no measurement software, then the invention makes provision for the measured values ascertained to be able to be indicated and post-processed in any software, including MS Excel or MS Word, for example.

Advantageously, the system control in the mobile measurement system may be in a form such that calling up MS Excel, for example, prompts the display of the actuation appliance, for example a PDA, to change over to landscape format in order to allow better presentation of measurement calculations and illustrations.

The inventive method of operation for a mobile measurement system may involve the use of a standard PC which is used as an actuation appliance and hence advantageously as remote control for the apparatus for optical distance measurement in the system. This allows direct simplification and cost reduction in such an apparatus for optical distance measurement. Simple extension of the system control, which advantageously may be in the form of an additional computer program or subprogram, for example, provides the option of possibly extending additional appliance functions in a mobile measurement system. Thus, by way of example, provision could be made for continuous measurement with an indication of the maximum number of measurements in a previously defined time interval. In addition, a timer function could also be provided, for example, which automatically initiates a measurement after a time interval which can be set by the operator.

The system control for the inventive method of operation is advantageously made possible by a computer program product, for example a driver program, which, when executed on a computer serving as an actuation appliance for the mobile measurement system, controls the method for operating the system in the described manner.

Further advantages of the inventive mobile measurement system and of the method of operation for such a mobile measurement system can be taken from the drawings below and from the associated description of advantageous embodiments.

BRIEF DESCRIPTION OF THE DRAWINGS

The drawing shows embodiments of the inventive method of operation and of the inventive system, which will be explained in more detail in the description below. The figures of the drawing, the description thereof and also the claims contain numerous features in combination. A person skilled in the art will also consider these features individually and will combine them into further, appropriate combinations which are thus to be regarded as likewise disclosed in the description.

In the drawing.

DETAILED DESCRIPTION

Figure 1:
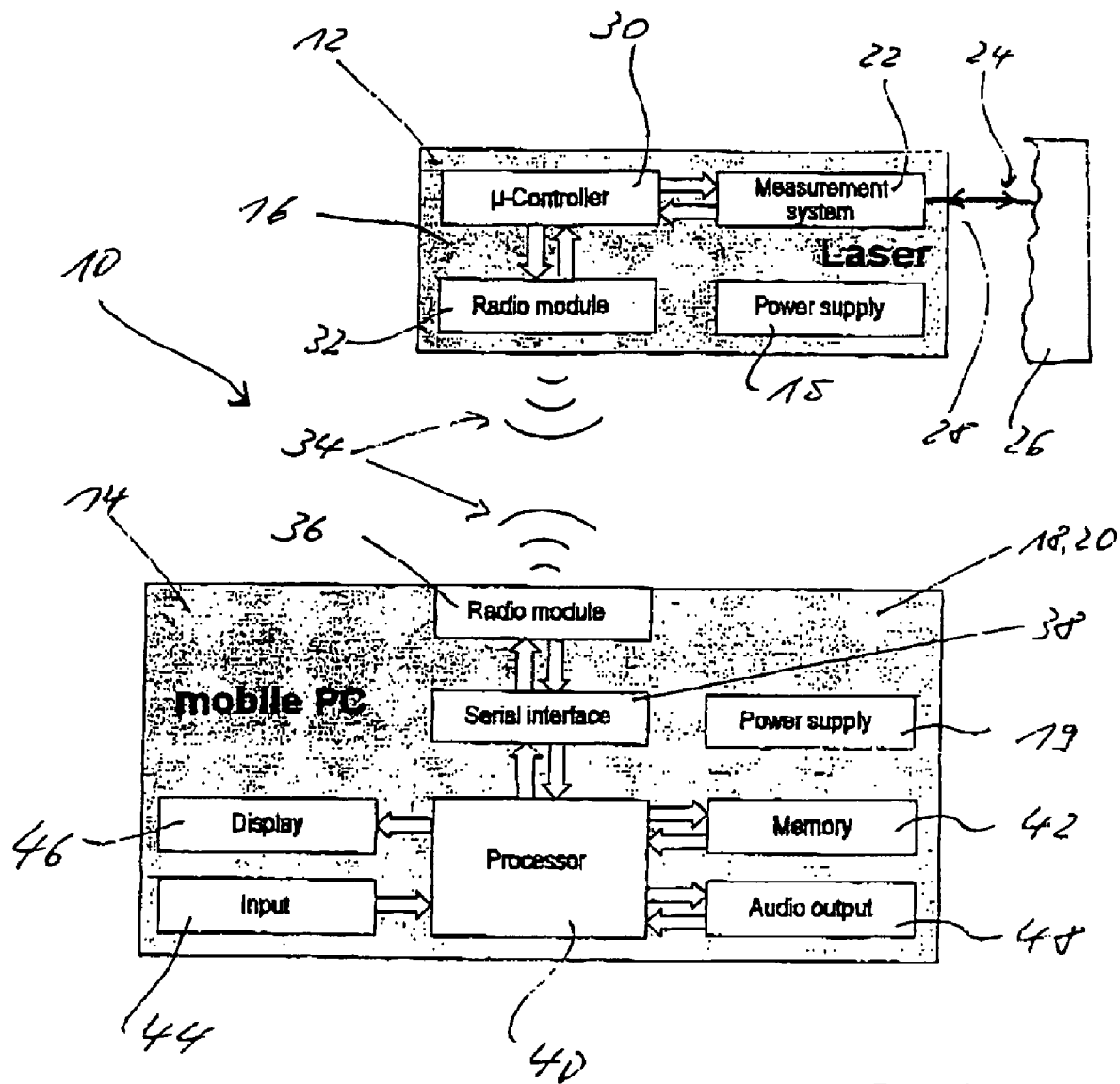
FIG. 1 shows a schematic block diagram of a mobile measurement system based on the invention.

FIG. 1 shows a schematic block diagram of an exemplary embodiment of a mobile measurement system 10 based on the invention. The inventive mobile measurement system in line with the embodiment in FIG. 1 comprises two separate housing units 12 and 14, with the housing unit 12 comprising an apparatus for optical distance measurement 16, subsequently also called laser rangefinder for short. The housing unit 14 is formed by an actuation appliance 18 which is in the form of a mobile PC 20 in the exemplary embodiment in FIG. 1.

The apparatus for optical distance measurement 16 has a measurement system 22, having at least one transmission unit having a light source, for example a semiconductor laser, for emitting modulated optical radiation 24 in the direction of a target object 26, and a reception unit for receiving the optical measurement radiation 28 returning from the target object 26. The measurement system 22 in the apparatus for optical distance measurement 16 is actuated using a microcontroller 30 which is coupled to a radio module 32.

The radio module 32 in the laser rangefinder 16 sends and receives electromagnetic radiation 34 in line with the Bluetooth Standard, The actuation appliance 18 has a corresponding radio module 36 for receiving and emitting this radiation 34. The radio module 32, the radiation 34 and the radio module 36 thus form a radio interface 31 for the data interchange between the two appliance units 12 and 14. A serial interface 38, for example an RS232 or UART interface, which is provided in the actuation appliance 18, is used to supply the radio signal 34 to a processor 40. The processor 40 controls the further data transmission and processing with a memory element 42, an input apparatus 44 and an output unit, which is in the form of a display 46 in the exemplary embodiment in FIG. 1. In addition, the actuation appliance 18 has an audio output 48, which confirms the successful data transmission between the actuation appliance 18 and the housing unit 12 in the apparatus 16 for optical distance measurement, for example. For the supply of current and voltage, the actuation appliance 18 has an appropriate power supply 19.

In the exemplary embodiment in FIG. 1, the apparatus 16 for optical distance measurement is operated directly using the input unit 44 on the actuation appliance 18. Likewise, the returning measurement signal 28 is evaluated, and in particular the distance between the apparatus 16 for optical distance measurement and the target object is ascertained, using the processor 40 in the actuation appliance 18. In alternative embodiments, both or just one respective part may also occur directly in the laser rangefinder. The measurement results, for example the distance between the housing unit 12 of the apparatus 16 for optical distance measurement 16 and the target object 26, is output on the display 46 on the actuation appliance 18 in the exemplary embodiment shown in FIG. 1. In this embodiment, the actuation appliance 18 is thus used as a type of remote control for the apparatus 16 for optical distance measurement or the laser rangefinder.

The invention thus provides for the actuation appliance 18, i.e. the PC 20 in the exemplary embodiment in FIG. 1, also to be used for one or more apparatuses for optical distance measurement. Since the mobile PC can be connected to the apparatus 16 for optical distance measurement by radio over a range of approximately 10 m, it may also advantageously be used for actuating laser range finders. One significant advantage of this embodiment of the inventive mobile measurement system is the fact that the laser rangefinder can thus be constructed less expensively, smaller and more easily, since expensive components such as a display, the memory, a processor or the keyboard for such an appliance can be dispensed with completely or in part, since these can be provided by corresponding software functions on the actuation appliance, i.e. PC 20.

The reduction of the functions of the actual laser rangefinder 16 significantly reduces the power consumption of the laser rangefinder. Since the supply of current or voltage 15 for such an appliance is provided by means of batteries or storage batteries for reasons of mobility, this allows longer battery operating times to be achieved. In addition, it is possible, for example through software-controlled power management, to transfer the radio link 31 between one laser rangefinder 16 and the associated actuation appliance 18 to a sleep mode after a few seconds if no data transmission is taking place. Such a refinement allows the battery life for the power supply 15 to be significantly increased again.

In other, alternative embodiments, the input unit, a corresponding signal processing processor and, by way of example, a visual display may alternatively also be provided in the housing unit 12 or else in both housing units 12 and 14. In particular, the inventive method of operation for a mobile measurement system thus makes it possible to use a commercial rangefinder as the apparatus 16 for optical distance measurement and to control it using an appropriate system controller in the form of a piece of driver software using the actuation appliance 18.

Figure 2:
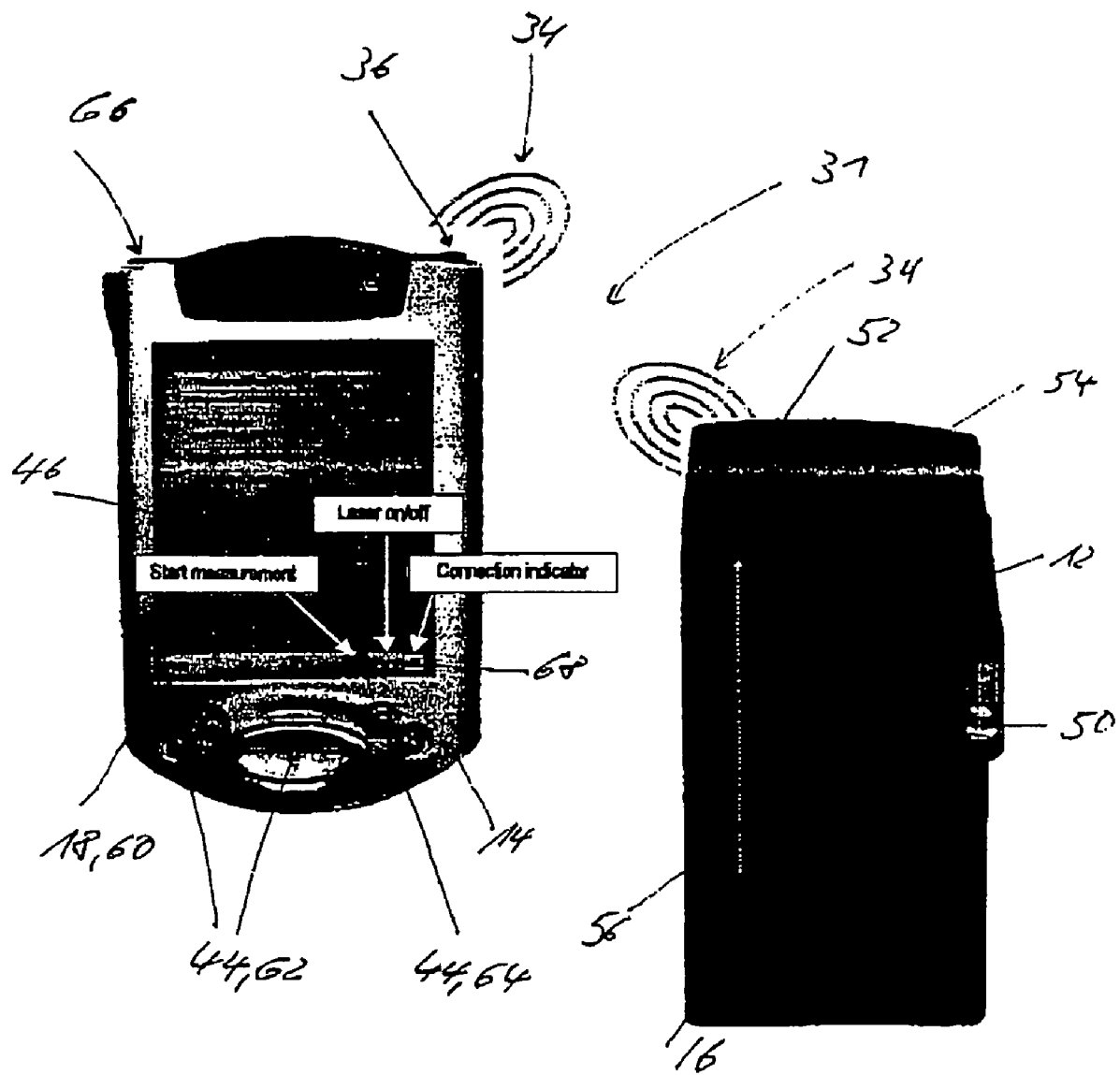
FIG. 2 shows one possible exemplary embodiment of a mobile measurement system based on the invention.

FIG. 2 shows one possible exemplary embodiment from a multiplicity of further possible embodiments of the inventive mobile measurement system. In this case, the apparatus 16 for optical distance measurement operates on the basis of the phase measurement principle and is accommodated in a first housing unit 12 which, for its part, has no control elements at all. The housing is equipped merely with an apparatus for measuring inclination, which is in the form of a spirit level 50 in the embodiment in FIG. 2. Using this apparatus for measuring inclination, a user is able to orient the apparatus 16 for optical distance measurement horizontally and thus to perform exact distance measurement between the apparatus 16 for optical distance measurement and a desired target object. The housing unit 12 has an exit window 52 for the electromagnetic measurement radiation and also an entry window 54 for the measurement radiation 28 reflected or scattered back from a target object 26.

In this case, the electromagnetic measurement radiation, for example an amplitude and/or phase modulated optical measurement signal, is emitted in the direction of the arrow 56 indicated on the housing surface 54. The means for producing the modulated measurement radiation are in a known form and are integrated in the housing unit 12.

A radio module which is likewise integrated inside the housing 12 connects the apparatus 16 for optical distance measurement via the radio interface 31 and the radiation 34 to the actuation appliance 18, which is in the form of a "PDA" (Personal Digital Assistant) in the embodiment in FIG. 2. This mobile computer has an operating system and also various application software, which may be stored in an appropriate memory element.

In addition, the PDA 60 has a visual display 46 and input means 44. The input means 44 may be in the form of mechanical pressure switches 62, for example, or else in the form of softkeys 64 on the appliance's user interface, which is formed by the display 46 in the exemplary embodiment in FIG. 2.

In addition, the actuation appliance 18 shown in FIG. 2 in the form of a PDA 60 has a further interface 66 for connection to a further computer. This additional interface can be used to transfer data which are stored on the PDA 60 or else have already been processed to a fixed computer, for example additionally.

Alternatively, the radio module 36 may also be used for transmitting data between the PDA 60 and an additional computer (not shown further in FIG. 2).

Following connection setup between the PDA 60 and the apparatus 16 for optical distance measurement via the interface 31, the apparatus 16 can be used in the manner of a remote control using the PDA's control elements 44, 62, 64.

In the inventive measurement system 10, or in the inventive operating system of the measurement system 10, the connection setup between the PDA 60 or PC 20 and the apparatus 16 for optical distance measurement takes place automatically. In this case, a user need not concern himself at all with the necessary configuration of the interface 31. He does not need to select a COM port, a baud rate or a transmission format for the data transmission. A user also need not call up a further connection tool, such as a Bluetooth Manager, in order to setup the desired connection between the housing units 12 and 14. This is all done by the system control in the inventive mobile measurement system in the form of software, which is preferably integrated in the actuation appliance 18. Once a connection has been set up between the apparatus 16 for optical distance measurement and the PC or PDA 60, measured data are transmitted after each measurement using the laser rangefinder 16, for example. In this case, the transmission of measured data does not need to be initiated separately in each case. If the connection is interrupted, for example as a result of an appliance being turned off, then automatic attempts are again made to re-establish the connection via the interface 31.

In the case of automatic connection setup, all apparatuses for optical distance measurement which are available via the interface 31 are automatically addressed via the Bluetooth Interface 31. The apparatuses 16 for optical distance measurement which can be reached thus report to the inventive operating system with their serial number in a selection window on the actuation appliance 18, which is formed by the display 46 on the PDA 60 in the embodiment in FIG. 2. A user can thus select the desired apparatus 16 for optical distance measurement using the selection window. A user of the inventive mobile measurement system can thus use the selection window for precisely specifying which apparatus 16 for optical distance measurement he would like to use to set up a permanent connection. Following this selection, serial communication via the interface 38 associated with the actuation appliance 18 is used. Once such a connection has been set up and when an indicator 68 in the display 46 on the actuation appliance 18 signals that the radio link 31 is ready to operate, a distance measurement can be taken using the control elements 44.

Particularly simple operation of the inventive measurement system is provided by a system of symbols which is as neutral-language as possible and has a minimum of necessary elements, said system of symbols being provided in software by the actuation appliance, that is to say a PC 20 or a PDA 60, for example. In this case, in particular, no appliance-specific user interface for the apparatus 16 for optical distance measurement is required in order to be able to use the mobile measurement system conveniently.

When a measurement has been initiated using the actuation appliance 18, that is to say a mobile PC 20 or the PDA 60 shown in FIG. 2, for example, the measured value recorded is automatically transmitted via the radio interface 31 and is written at the Current cursor position of a software product implemented in the actuation appliance 18 and is shown on the display 46 provided. In this case, an audio output 48 provided in the actuation appliance 18 can be used to signal the successful completion of a distance measurement to the user.

A piece of measurement software with which the user is familiar may advantageously be used directly in order to allocate the measured values clearly to individual positions, yields or objects, or to calculate and store corresponding results. Such commercial measurement software may advantageously be loaded on the actuation appliance 18. The greatest degree of flexibility is provided for the inventive mobile measurement system, since the interface 31 permits direct linkage to various measurement software independently of application. Thus, by way of example, a full tender can be produced directly in situ, that is to say even on a building site. Should the user have no special measurement software, the measured values transmitted can be indicated and postprocessed in any standard software, for example MS Excel or MS Word, which are typically available as standard on any PC or any PDA.

It is optionally possible to extend the possible appliance functions of the actuation appliance 18 or of the apparatus 16 for optical distance measurement by simply extending the PC software. In this case, provision may advantageously be made, for example, to perform continuous measurement with an indication of the maximum number of measurements in a definable time interval. In addition, a timer function may also be provided, for example, which initiates one or more measurements in or after a time interval which can be set by the user.

The apparatus 16 for optical distance measurement advantageously requires no cable connection and can thus be better protected against soiling and moisture. The actuation appliance 18, which may be provided in the form of a PC 20 or PDA 60, for example, may also be provided for applications other than the described use as an actuation appliance 18 in a mobile measurement system, which means that the price/performance ratio for the inventive mobile measurement system is improved accordingly.

In one advantageous embodiment of the inventive measurement system, provision may be made for the apparatus 16 for optical distance measurement to he fastened to the actuation appliance 18 using a mechanical fastener, for example a universal clip. This universal clip is clipped onto the apparatus 16 for optical distance measurement, for example, or else is connected to the actuation appliance 18 by means of a Velcro fastener With this form of the apparatus 16 for optical distance measurement as a plug-on module for the actuation appliance 18, the effect achieved is that input, which is usually performed using a stylus on mobile PCs, becomes more user friendly.

Figure 3:
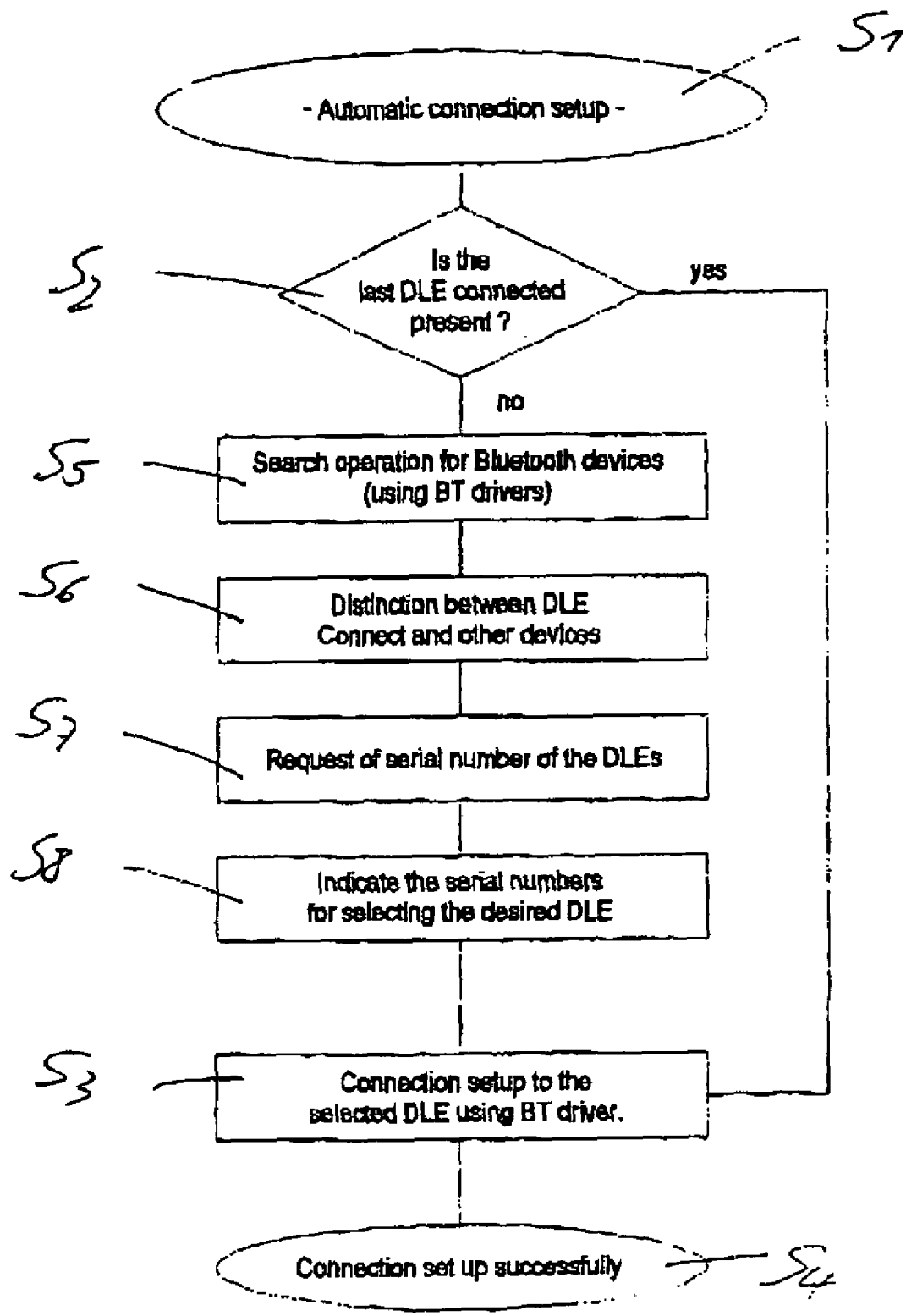
FIG. 3 shows a flowchart illustration of method steps for the automatic connection setup in the inventive method of operation for a mobile measurement system.

FIG. 3 shows a few method steps in the method of operation for automatically setting up a connection between the actuation appliance 18 and the range measuring unit 16 in the inventive mobile measurement system. In this case, the radio link between the appliance units 12 and 14 (see also FIG. 2 below in each case) is controlled automatically by means of a computer program product which is used as driver software.

When the appliances in the mobile measurement system and, in particular, the actuation appliance 18 have been turned on, or when they are again ready to send and/or receive following disconnection of the contact between the appliances, and when the driver software has been started, as is intended to be indicated by method step S1, method step S2 first involves a check to determine whether the last laser rangefinder (DLE) 16 which was connected can be reached via the interface 31. To this end, the connection can be set up, for example automatically, to all laser rangefinders with a Bluetooth Interface, or else there may be just a specific search for the last appliance used. It is advantageous to set up the connection to the last appliance used automatically first of all, and, should this not be possible, then to search for all laser rangefinders with a Bluetooth interface.

If the enquiry into the presence of the last laser rangefinder used is answered positively by the system controller, the method of operation skips to method step S3, which is used to set up the connection to the selected laser rangefinder, in this case the last laser rangefinder used, via an external Bluetooth driver (BT driver), i.e. one which is provided in the actuation appliance 18.

Successful connection setup is indicated in method step S4 in the display apparatus 46 on the actuation appliance 18 or 60 (see FIG. 2) and may additionally be supported by an audible signal, for example.

If it is not possible to set up a connection to the last laser rangefinder 16 used, the inventive method of operation branches to method step 5. In this method step S5, a search routine is started for all appliances which can be reached via the radio interface 31, particularly for all laser rangefinders which can be reached which have a Bluetooth interface, for example.

In method step S6, a distinction is then drawn between laser rangefinders reached via the interface and other appliances which have been addressed via the interface. To this end, particularly in method step S7, a query is started by the actuation appliance asking the localized laser rangefinders to transmit their serial number to the actuation appliance 18. The transmitted serial numbers are then listed in the visual display on the actuation unit, for example the display 46 on the PDA 60 shown in FIG. 2, in line with the method step S8, so that a user can select and directly address the appliance which he requires. Following selection of the required appliance using an appropriate menu, which can be controlled using the actuation appliance's user interface, for example, the automatic connection setup between the actuation appliance (PDA) and the selected laser rangefinder (DLE) takes place in line with method step S3.

In the course of this connection setup, a user need not concern himself at all with the configuration of the interface 31. He does not need to select a COM port, a baud rate or a transmission format for the data transmission. A user also does not need to call up a further connection tool, such as a Bluetooth manager, in order to produce the desired connection between the housing units 12 and 14. This is all done and automatically controlled by the system controlling the inventive mobile measurement system in the form of software, which is preferably integrated in the actuation appliance 18.

Successful connection setup is in turn indicated on the display apparatus 46 on the actuation appliance 18 or 60 in method step S4 (see FIG. 2) and may be supported by an audible signal, for example, as soon as the radio link is ready to operate.

Once a connection has been set up between the laser rangefinder or the apparatus 16 for optical distance measurement and the PC, for example a PDA as shown in FIG. 2, measured data are automatically transmitted, for example after every measurement with the laser rangefinder 16. In this case, the transmission of measured values between the appliance units in the mobile measurement system does not need to be initiated separately by the user in each case. Following the initiation of a measurement using the actuation appliance, that is to say a mobile PC, for example, the measured value recorded is automatically transmitted via the radio interface and is indicated at the current cursor position on the mobile PC's display which is provided.

If the connection via the interface 31 is interrupted, for example as a result of one or both appliances being turned off, then attempts are also automatically made to re-establish the connection via the interface S1 by virtue of the method returning to method step S1 again.

The universal radio interface ensures user-friendly handling and compatibility with a multiplicity of mobile PCs. In particular, universal use of any software products is assured, since the transmission of measured values is always written to the current cursor position in the corresponding software product. Should the user have no appropriate measurement software, the measured data may therefore advantageously be indicated and postprocessed using any software which can be executed on the actuation appliance, for example standard software such as MS Word or MS Excel. Any software which also allows keyboard input may thus be used for showing or further processing the measured values from the inventive mobile measurement system.

It is also possible to transform an already existing computer, for example in the form of a mobile PC, into an actuation appliance for the inventive mobile measurement system using appropriate driver software. Such software or such a driver program, which is designed to control a computer such that it is operated as an actuation appliance in the inventive mobile measurement system, can be put on any known, computer-readable recording medium, for example, in order to form a mobile measurement system in conjunction with an already existing PC and a laser rangefinder in the described manner.

In line with the invention, the universal radio interface described which is based on the Bluetooth standard allows an inexpensive laser rangefinder to be connected to a commercially available, mobile standard PC. All functions going beyond the actual measurement method, such as calculation, storage, indication of measured data, and also the use of the appliance may be removed or remote from the laser rangefinder and advantageously displayed on an inexpensive, mobile standard PC. The inventive connection of the two appliances via the universal interface thus provides an inexpensive mobile measurement system. In alternative embodiments, however, provision may also be made for the apparatus for optical distance measurement to be a complete laser rangefinder which is also fully functional and operational individually and which can also be used as a separate unit without the actuation appliance. Advantageously, an appropriate computer program product may be provided which, as driver software, controls the flow of the inventive method of operation. In this way, it is possible to use an appropriately equipped laser rangefinder and, by way of example, a standard computer using such a computer program product to provide an inexpensive and efficient, mobile measurement system which additionally ensures ease of handling for the user.

In principle, such a mobile measurement system may also be produced with other rangefinders, for example ultrasonic or radar rangefinders.

The invention claimed is:

1. A method of operation for a mobile measurement system, having at least one hand-held apparatus (16) for optical distance measurement using modulated optical measurement radiation, the apparatus (16) having at least one transmission unit having a light source for emitting modulated, optical measurement radiation (24) in the direction of a target object (26) and a reception unit for receiving the optical measurement radiation (28) returning from the target object (26), and having an actuation appliance (18,20,60), having at least one memory element (42) suitable for holding range finding data, and having a display (42), the method comprising connecting the apparatus (16) for optical distance measurement to the actuation appliance (18,20,60) via a wireless interface (31) for the purpose of range finding data transmission thereafter transmitting range finding data from the apparatus (16) to the appliance (18,20,60) thereafter storing the transmitted range finding data in the memory element (42) of the appliance, and thereafter displaying the output on the display (42), and wherein the measured data is written to the current position of a cursor in a software product implemented in the actuation appliance (18,20,60).

2. The method of operation for a mobile measurement system as claimed in claim 1, wherein the connection setup takes place in the form of a radio link (34).

3. The method of operation for a mobile measurement system as claimed in claim 2, wherein the radio link (34) is controlled automatically using a piece of driver software.

4. The method of operation for a mobile measurement system as claimed in claim 3, wherein automatic connection setup involves all apparatuses (16) for optical distance measurement which are available via the interface (31) being addressed.

5. The method of operation for a mobile measurement system as claimed in claim 4, wherein all addressed apparatuses (16) for optical distance measurement are indicated in a selection window (46) on the actuation appliance (18, 20, 60).

6. The method of operation for a mobile measurement system as claimed in claim 1, wherein, in the case of the connection setup between the apparatuses (16) for optical distance measurement and the actuation appliance (18, 20, 60), every measurement by the apparatuses (16) for optical distance measurement is followed by transmission of measured values to the actuation unit.

7. The method of operation for a mobile measurement system as claimed in claim 1, wherein disconnection of the connection between the apparatus (16) for optical distance measurement and the actuation appliance (18, 20, 60) is followed by an automatic attempt to re-establish the connection.

8. The method of operation for a mobile measurement system as claimed in claim 1, wherein the actuation appliance (18, 20, 60) is used as remote control for the apparatuses (16) for optical distance measurement.

9. The method of operation for a mobile measurement system as claimed in claim 1, wherein the connection setup between the apparatus (16) and the actuation appliance (18, 20,60) takes place automatically.

10. The method of operation for a mobile measurement system as claimed in claim 1, wherein the optical distance measurements are initiated according to a timer function that is set by the user.

11. A method of operation for a mobile measurement system, having at least one hand-held apparatus (16) for optical distance measurement using modulated optical measurement radiation, the apparatus (16) having at least one transmission unit having a light source for emitting modulated, optical measurement radiation (24) in the direction of a target object (26) and a reception unit for receiving the optical measurement radiation (28) returning from the target object (26), and having an actuation appliance (18,20,60), having at least one memory element (42) suitable for holding range finding data, and having a display (42), the method comprising connecting the apparatus (16) for optical distance measurement to the actuation appliance (18,20,60) via a wireless interface (31) for the purpose of range finding data transmission thereafter transmitting range finding data from the apparatus (16) to the appliance (18,20,60) thereafter storing the transmitted range finding data in the memory element (42) of the appliance, and thereafter displaying the output on the display (42), wherein the connection setup takes place in the form of a radio link (34), wherein the radio link (34) is controlled automatically using a piece of driver software, and wherein the system control for transmitting measured data is effected in a manner such that the measured data are always written to the current position of a cursor in a software product implemented in the actuation appliance (18, 20, 60).

12. The method of operation for a mobile measurement system as claimed in claim 11, wherein automatic connection setup involves all apparatuses (16) for optical distance measurement which are available via the interface (31) being addressed.

13. The method of operation for a mobile measurement system as claimed in claim 12, wherein all addressed apparatuses (16) for optical distance measurement are indicated in a selection window (46) on the actuation appliance (18, 20, 60).

14. The method of operation for a mobile measurement system as claimed in claim 11, wherein, in the case of the connection setup between the apparatuses (16) for optical distance measurement and the actuation appliance (18, 20, 60), every measurement by the apparatuses (16) for optical distance measurement is followed by transmission of measured values to the actuation unit.

15. The method of operation for a mobile measurement system as claimed in claim 11, wherein disconnection of the connection between the apparatus (16) for optical distance measurement and the actuation appliance (18, 20, 60) is followed by an automatic attempt to re-establish the connection.

16. The method of operation for a mobile measurement system as claimed in claim 11, wherein the actuation appliance (18, 20, 60) is used as remote control for the apparatuses (16) for optical distance measurement.

17. The method of operation for a mobile measurement system as claimed in claim 11, wherein the connection setup between the apparatus (16) and the actuation appliance (18, 20,60) takes place automatically.

18. The method of operation for a mobile measurement system as claimed in claim 11, wherein the optical distance measurements are initiated according to a timer function that is set by the user.

19. A method of operation for a mobile measurement system, having at least one apparatus (16) for optical distance measurement which has at least one transmission unit having a light source for emitting modulated, optical measurement radiation (24) in the direction of a target object (26) and a reception unit for receiving the optical measurement radiation (28) returning from the target object (26), and having an actuation appliance (18,20,60), having at least one memory element (42) suitable for holding range finding data, and having a display (42), the method comprising connecting the apparatus (16) for optical distance measurement to the actuation appliance (18, 20, 60) via a wireless interface (31) for the purpose of range finding data transmission thereafter transmitting range finding data from the apparatus (16) to the appliance (18,20,60) thereafter storing the transmitted range finding data in the memory element (42) of the appliance, and thereafter displaying the output on the display (42), wherein the connection setup takes place in the form of a radio link (34), wherein the radio link (34) is controlled automatically using a piece of driver software, wherein the system control for transmitting measured data is effected in a manner such that the measured data are always written to the current position of a cursor in a software product implemented in the actuation appliance (18, 20, 60).

20. A method of operation for a mobile measurement system, having at least one apparatus (16) for optical distance measurement which has at least one transmission unit having a light source for emitting modulated, optical measurement radiation (24) in the direction of a target object (26) and a reception unit for receiving the optical measurement radiation (28) returning from the target object (26), and having an actuation appliance (18,20,60), having at least one memory element (42) suitable for holding range finding data, and having a display (42), the method comprising connecting the apparatus (16) for optical distance measurement to the actuation appliance (18, 20, 60) via a wireless interface (31) for the purpose of range finding data transmission thereafter transmitting range finding data from the apparatus (16) to the appliance (18,20,60) thereafter storing the transmitted range finding data in the memory element (42) of the appliance, and thereafter displaying the output on the display (42), wherein the measured data is written to the current position of a cursor in a software product implemented in the actuation appliance (18,20,60).

* * * * *